(12) United States Patent
Watanabe et al.

(10) Patent No.: US 7,595,481 B2
(45) Date of Patent: Sep. 29, 2009

(54) SCANNING OPTICAL SYSTEM MEASURING DEVICE AND SCANNING OPTICAL SYSTEM MEASURING METHOD

(75) Inventors: Wataru Watanabe, Shizuoka-ken (JP); Takahiro Chikuda, Shizuoka-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 75 days.

(21) Appl. No.: 11/840,372

(22) Filed: Aug. 17, 2007

(65) Prior Publication Data
US 2009/0045324 A1 Feb. 19, 2009

(51) Int. Cl.
*H01J 3/14* (2006.01)
*G02B 7/04* (2006.01)
*H04N 1/04* (2006.01)

(52) U.S. Cl. .............. 250/234; 250/201.4; 358/474

(58) Field of Classification Search ......... 250/234–236, 250/201.2, 201.3, 201.4, 559.36, 201.5–201.9; 358/474–476, 496, 498; 347/129–133, 224–230; 356/121, 122, 400, 141.4
See application file for complete search history.

(56) References Cited

U.S. PATENT DOCUMENTS

| 7,098,448 | B2 * | 8/2006 | Inoue et al. ............ 250/234 |
| 7,397,059 | B2 * | 7/2008 | Ishisaka ................. 250/586 |
| 2007/0272841 | A1 * | 11/2007 | Wiklof ................... 250/234 |

FOREIGN PATENT DOCUMENTS

JP 08-262350 10/1996

\* cited by examiner

*Primary Examiner*—Kevin Pyo
*Assistant Examiner*—Don Williams
(74) *Attorney, Agent, or Firm*—Turocy & Watson, LLP (57) ABSTRACT

Measurement of a scanning optical system is to be carried out simply and easily. According to the invention, a scanning optical system measuring device for making adjustment of a scanning optical system which performs scanning with a light beam, includes: plural one-dimensional position detection devices provided at a distance from each other in a scanning direction of a light beam caused to perform scanning, and arranged to intersect the scanning direction of the light beam, and configured to output light receiving position of the light beam caused to perform scanning, as an analog signal; and a detection signal processing unit configured to detect scanning state of the light beam on the basis of a detection signal of the one-dimensional position detection devices.

18 Claims, 10 Drawing Sheets

OPTICAL CURRENT $(I_0) = I_1 + I_2$

SCANNING OPTICAL SYSTEM MEASURING DEVICE AND SCANNING OPTICAL SYSTEM MEASURING METHOD

BACKGROUND OF THE INVENTION

1. Field of the Related Art

The present invention relates to a measuring device and a measuring method for adjusting a scanning optical system which scans with a light beam, and particularly to a scanning optical system measuring device and a scanning optical system measuring method which can be applied to an image forming apparatus or the like having a scanning optical system such as a laser beams printer.

2. Description of the Related Art

At the time of assembling an image forming apparatus, an optical scanning system must be adjusted to properly scan a photoconductor with a light beam. Traditionally, a device as shown in FIG. 12 is known as a measuring device for this adjustment of the scanning optical system.

Figure 12:
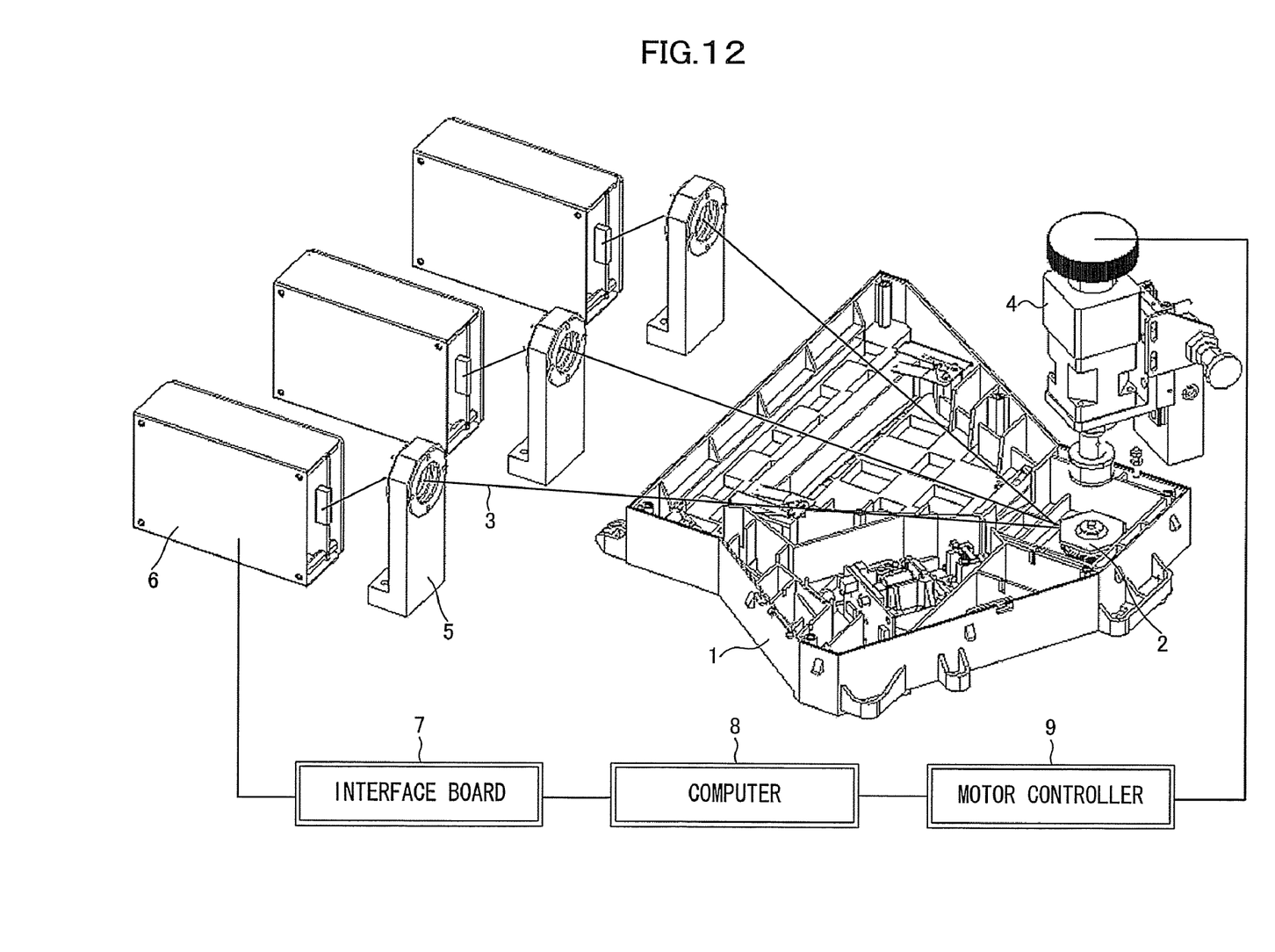
FIG. 12 is a schematic configuration view showing a traditional technique.

In the measuring device shown in FIG. 12, facing a scanning optical system unit 1, two-dimensional position detection devices 5 which are plural photodetector devices are arranged along the scanning direction at positions where photoconductors are arranged, and the scanning state is measured on the basis of the light receiving position of each two-dimensional position detection devices 5. As the scanning state, the image forming position, tilt of the sub scanning line and curving of the scanning line of the scanning optical system unit 1 are measured.

Detection signals detected by the two-dimensional position detection devices 5 are processed by a signal processing circuit 6 and then taken into a computer 8 via an interface board 7, and predetermined measuring processing is carried out. In this case, since the computer 8 detects the light receiving position for each of the two-dimensional position detection devices 5, a light beam static mechanism 4 is controlled by a motor controller 9 to stop the rotating operation of a rotary polygon mirror and to define the stop position at a predetermined position so that a light beam is made incident on a two-dimensional position detection device as a detection target.

As another technique, JP-A-8-262350 is known. This technique uses a CCD device as a photodetector device and carries out measurement with a rotary polygon mirror in the rotating state. Therefore, a scanning timing detecting unit which detects the scanning timing of a light beam is provided, and the light detection timing is controlled synchronously with the scanning timing of the light beam.

However, in the former measuring method using the two-dimensional position detection devices, since their light receiving positions are detected, a large amount of arithmetic operation is necessary and the detection processing time is long. Therefore, as described above, in the case where a light beam is made incident on the two-dimensional position detection devices, the light beam must be made static during the time required for the processing. The light beam static mechanism 4 and its control mechanism require high costs, and it takes a long time to perform induction processing of the light beams to the two-dimensional position detection devices and signal processing, thus causing the adjustment time to be long. For example, an adjustment operator cannot make adjustment while visually recognizing the result of the adjustment operation in real time. As a result, there is inconvenience that the adjustment operation is difficult.

On the other hand, in the latter technique, the CCD device is used and the measuring resolution is one pixel of the CCD. Therefore, a target measuring accuracy cannot be achieved in some cases, and large-scale computer software for image processing of measurement data is required, thus increasing the cost of the device. Moreover, since the synchronization timing must be taken, there is inconvenience that signal processing between the scanning timing detecting unit and the measuring CCD driving unit is very complicated.

SUMMARY OF THE INVENTION

The present invention is made in view of the foregoing problems and its object is to provide a scanning optical system measuring device and a scanning optical system measuring method which can be configured very easily and at a low cost, and which enable real-time visual recognition of the result of adjustment operation by an operator and enable easy adjustment.

To solve the foregoing problems, according to an aspect of the invention, a scanning optical system measuring device for making adjustment of a scanning optical system which performs scanning with a light beam, includes: plural one-dimensional position detection devices provided at a distance from each other in a scanning direction of a light beam caused to perform scanning, and arranged to intersect the scanning direction of the light beam, and configured to output light receiving position of the light beam caused to perform scanning, as an analog signal; and a detection signal processing unit configured to detect scanning state of the light beam on the basis of a detection signal of the one-dimensional position detection devices.

Also, according to another aspect of the invention, a scanning optical system measuring device for making adjustment of a scanning optical system which performs scanning with a light beam, includes: plural one-dimensional position detection means provided at a distance from each other in a scanning direction of a light beam caused to perform scanning, and arranged to intersect the scanning direction of the light beam, and for outputting light receiving position of the light beam caused to perform scanning, as an analog signal; and detection signal processing means for detecting scanning state of the light beam on the basis of a detection signal of the one-dimensional position detection means.

Moreover, according to still another aspect of the invention, a scanning optical system measuring method for making adjustment of a scanning optical system which performs scanning with a light beam, includes: providing plural one-dimensional position detection devices arranged at a distance from each other in a scanning direction of a light beam which is caused to scan, and arranged to intersect the scanning direction of the light beam, and configured to output light receiving position of the light beam which is caused to scan, as an analog signal; performing scanning with the light beam and detecting the light receiving position by the one-dimensional position detection devices; and detecting scanning state of the light beam on the basis of the detected light receiving position.

DESCRIPTION OF THE EMBODIMENT

Hereinafter, an embodiment of the invention will be described with reference to the drawings.

Figure 1:
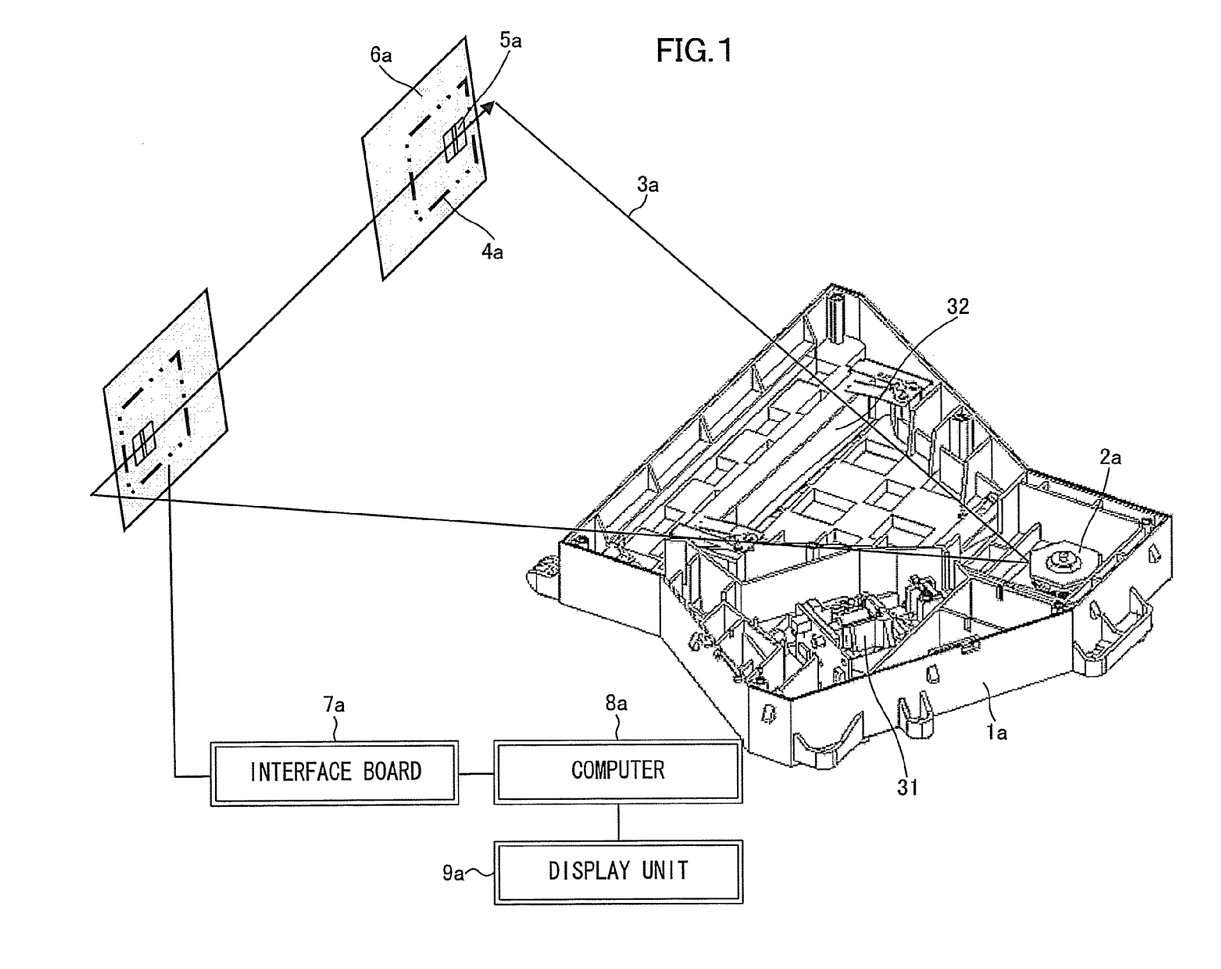
FIG. 1 is a view showing an outline of a scanning optical system measuring device and method according to an embodiment of the invention.

FIG. 1 is a view showing an outline of a scanning optical system measuring device and method according to an embodiment of the invention. The scanning optical system according to this embodiment is described as a scanning optical system used for an image forming apparatus.

As shown in FIG. 1, in the scanning optical system measuring device in this embodiment, facing a scanning optical system unit 1a having a scanning optical system incorporated therein, plural (for example, two) one-dimensional position detection devices (corresponding to one-dimensional position detection means of the invention) 5a are arranged along the scanning direction of a light beam 3a, and each one-dimensional position detection device 5a is arranged to intersect (preferably orthogonally) the scanning direction of the light beam. The positions where these one-dimensional position detection devices 1a are arranged correspond to the positions where photoconductors (image carriers) of the image forming apparatus (not shown) are arranged.

The scanning optical system unit 1a has a semiconductor laser unit 31 which casts laser light as a light beam, a rotary polygon mirror 2a which reflects the light beam cast from the semiconductor laser and causes it to perform scanning, and a correction lens 32 which corrects the light beam caused to perform scanning by the rotary polygon mirror 2a.

In such a configuration, the light receiving position is detected by each one-dimensional position detection device 5a in the state where the rotary polygon mirror 2a included in the scanning optical system unit 1a is rotated. Detection signals detected by the one-dimensional position detection devices 5a are taken into a computer 8a (corresponding to a detection signal processing unit or detection signal processing means of the invention) via a signal processing circuit 6a and a interface board 7a. The computer 8a calculates the tilt of the scanning line and the image forming position on the basis of the detection signals taken therein. The result of the calculation by the computer 8a is displayed by a display unit 9a. A numeral 4a represents an infrared transmitting filter.

The details will be described hereinafter.

Figure 2:
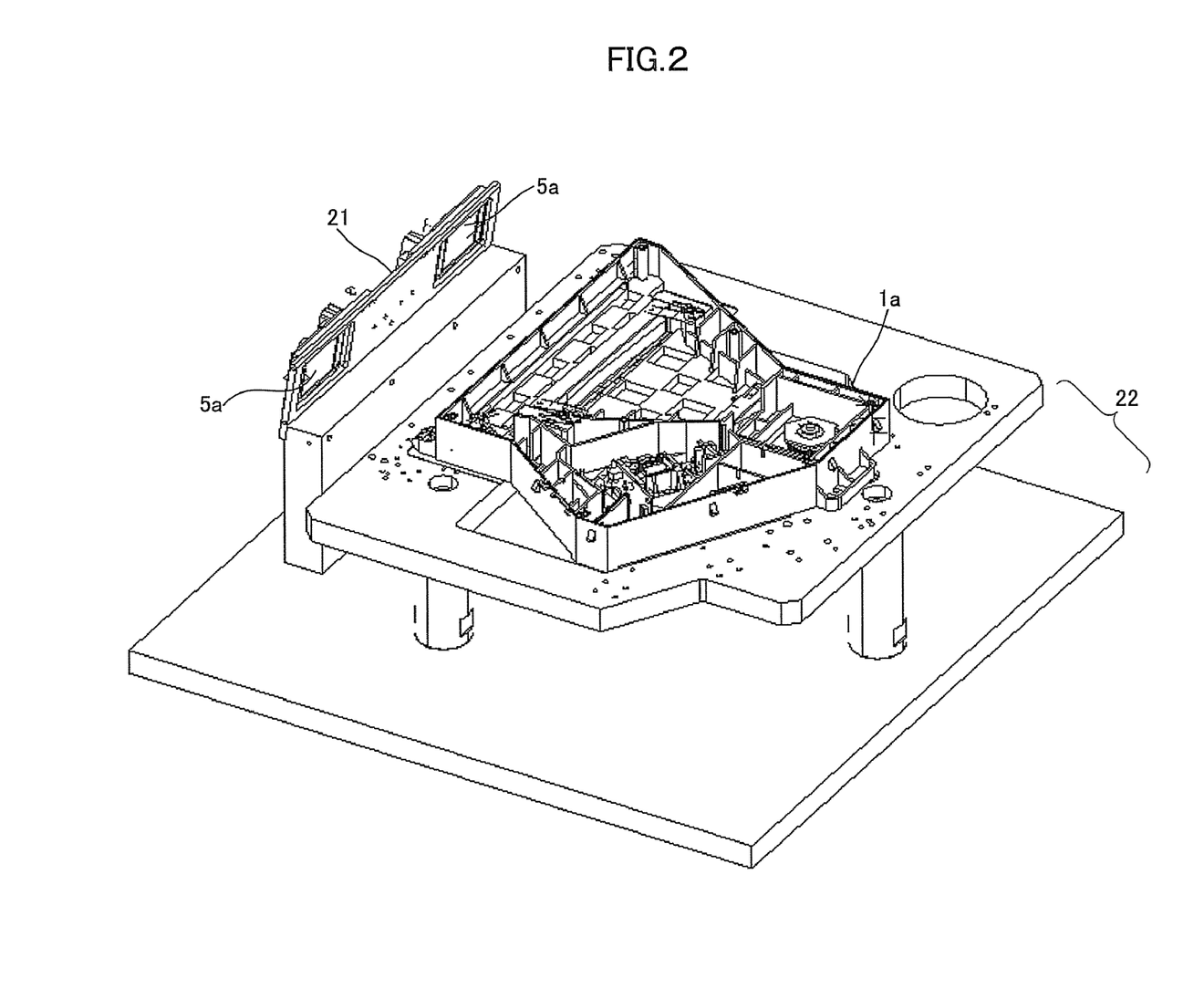
FIG. 2 is a perspective view showing the positional relation between a scanning optical system and one-dimensional position detection devices.
Figure 3:
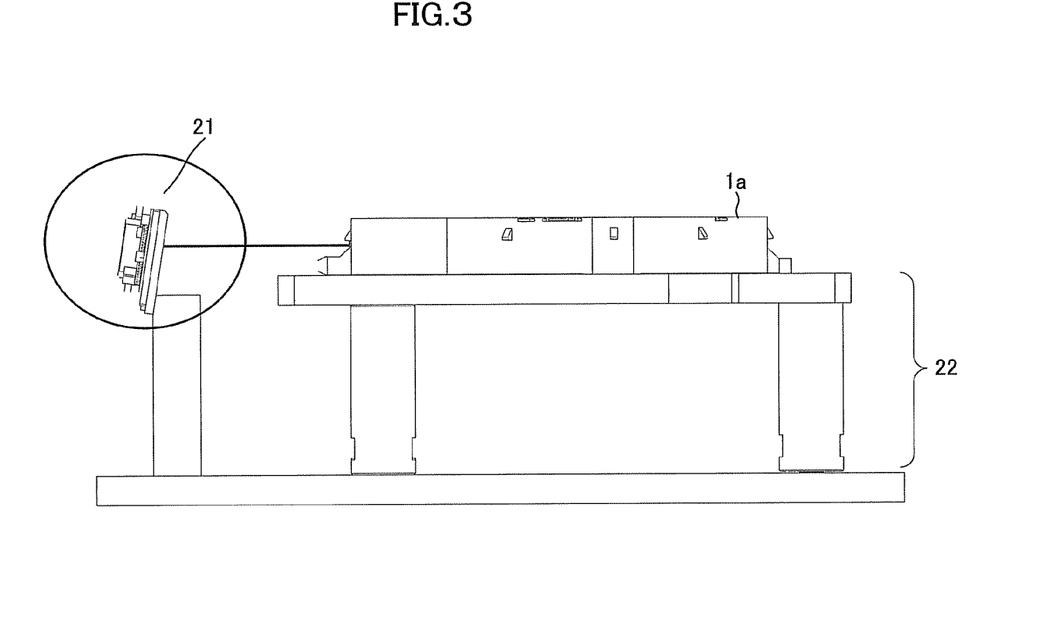
FIG. 3 is a side view showing the positional relation between the scanning optical system and the one-dimensional position detection devices.

FIG. 2 is a perspective view showing the positional relation between the scanning optical system unit 1a and the one-dimensional position detection devices 5a. FIG. 3 is a side view of the same. In FIG. 2 and FIG. 3, the scanning optical system unit 1a, a supporting plate 21 which supports the two one-dimensional position detection devices 5a in the scanning direction of the light beam, and a fixing stage for measurement 22 which supports the scanning optical system unit 1a and the supporting plate 21 in a manner of fixing them in a predetermined positional relation, are shown.

Figure 4:
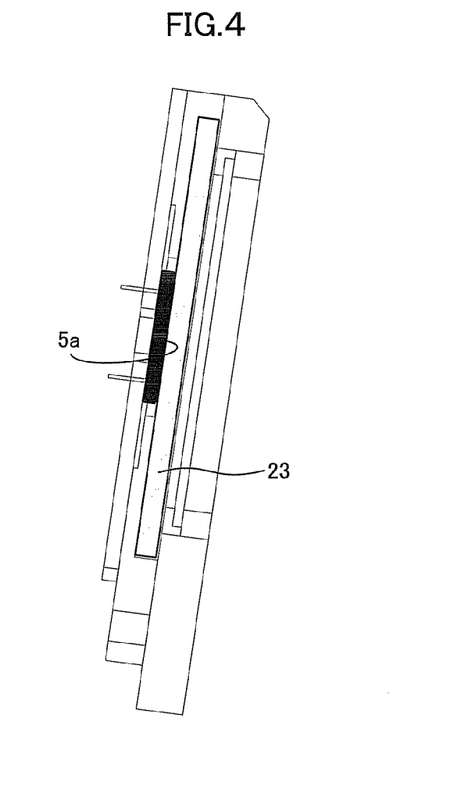
FIG. 4 is a side view showing the one-dimensional position detection device shown in FIG. 3, in detail.

The two one-dimensional position detection devices 5a are supported respectively near both edges of the scanning range, by the supporting plate 21. The light receiving side (light receiving part) of each one-dimensional position detection device 5a, which is its front side, is covered with an infrared transmitting filter (corresponding to infrared transmitting filtering means of the invention) 23, as shown in FIG. 4. The detection accuracy is thus prevented from being unstable because of the influence of disturbance light.

Figure 5:
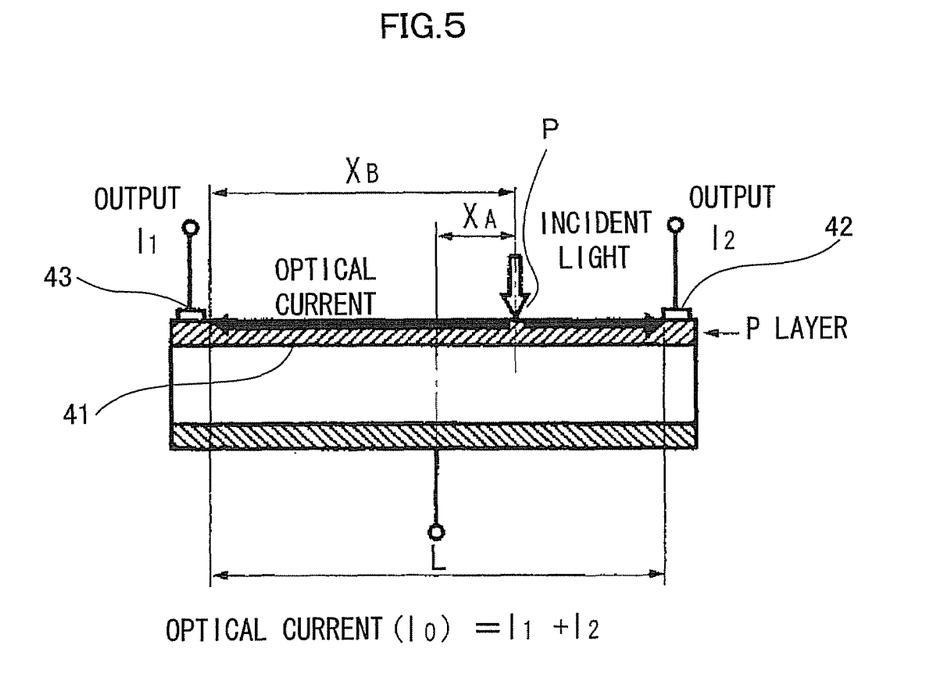
FIG. 5 is a view showing the principle of measurement by the one-dimensional position detection device.
Figure 6:
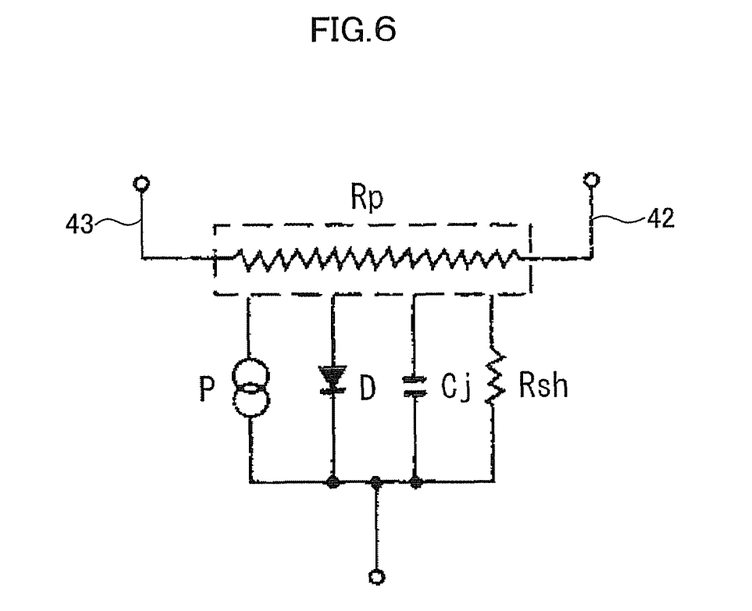
FIG. 6 is an equivalent circuit diagram of the one-dimensional position detection device.

FIG. 5 shows the principle of measurement by the one-dimensional position detection device. FIG. 6 shows an equivalent circuit of the one-dimensional position detection device.

The one-dimensional position detection device outputs a current such that current values outputted from both edges of the detection device having a predetermined length in a one-dimensional direction change in a predetermined relation in accordance with the light receiving position. As shown in FIG. 5, when light becomes incident on the light receiving surface, electric charges proportional to optical energy are generated at the position of incidence P. The generated electric charges pass through a resistance layer 41 as an optical current, which is then outputted from electrodes 42 and 43 provided at both edges. The resistance layer 41 has a uniform resistance value over its entire surface. The light current is divided in inverse proportion to the distance to the electrodes 42 and 43 and is outputted from the respective electrodes. Therefore, as the currents outputted from these electrodes are detected, the position of incidence of the light can be detected by predetermined arithmetic processing. This arithmetic processing is carried out by the signal processing circuit 6a and the result of the arithmetic processing is taken into the computer 8a via the interface board 7a.

Figure 7:
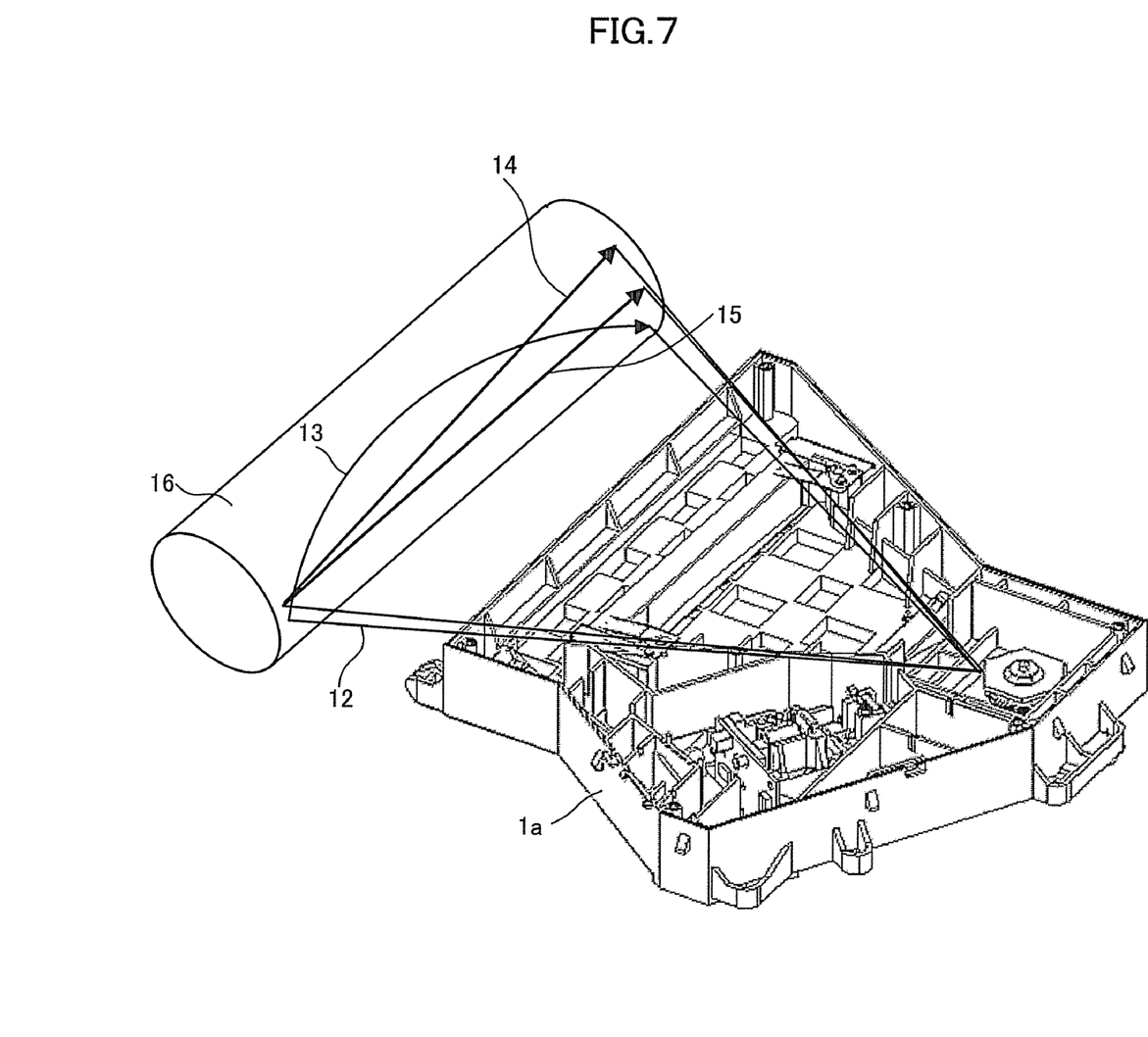
FIG. 7 is a schematic view showing the scanning state of a light beam.

On the basis of the detection position of a light beam 12 acquired by these two one-dimensional position detection devices 5a, the computer 8a calculates a tilt 14 of a scanning line (sub scanning line) and an image forming position 15 as shown in FIG. 7, and causes the display unit 9a to display the result of the calculation.

Figure 8:
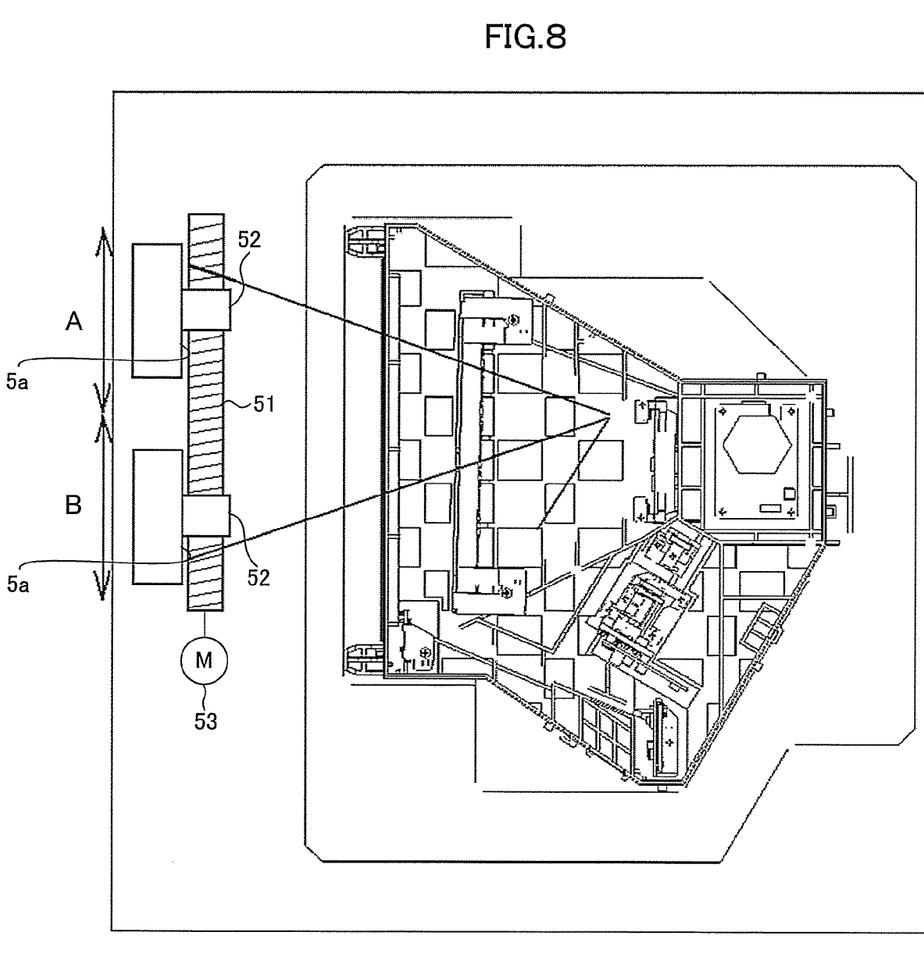
FIG. 8 is a view showing a scanning optical system measuring device as viewed from above, in order to show a modification of the embodiment.

In this embodiment, the number of one-dimensional position detection devices is two. However, as these devices are increased or each one-dimensional position detection device is provided movably along the direction of the scanning line so as to detect a light beam at plural moving positions, curving (denoted by 13 in FIG. 7) of the scanning line can also be detected. As a moving mechanism, for example, as shown in FIG. 8, a screw feed mechanism is formed by a feed screw 51 and supporting members 52 and 52, in which the feed screw 51 is inserted and screwed with inside screws to regulate their rotation. The one-dimensional position detection devices 5a and 5a are thus supported to the supporting members 52 and 52. Position control of the one-dimensional position detection devices 5a and 5b by driving control of the feed screw 51 can be carried out as a pulse motor 53 is drive-controlled by the computer 8a. In FIG. 8, a configuration is shown in which two one-dimensional position detection devices are provided and each of them moves in half areas A and B of the scanning line area.

Figure 9:
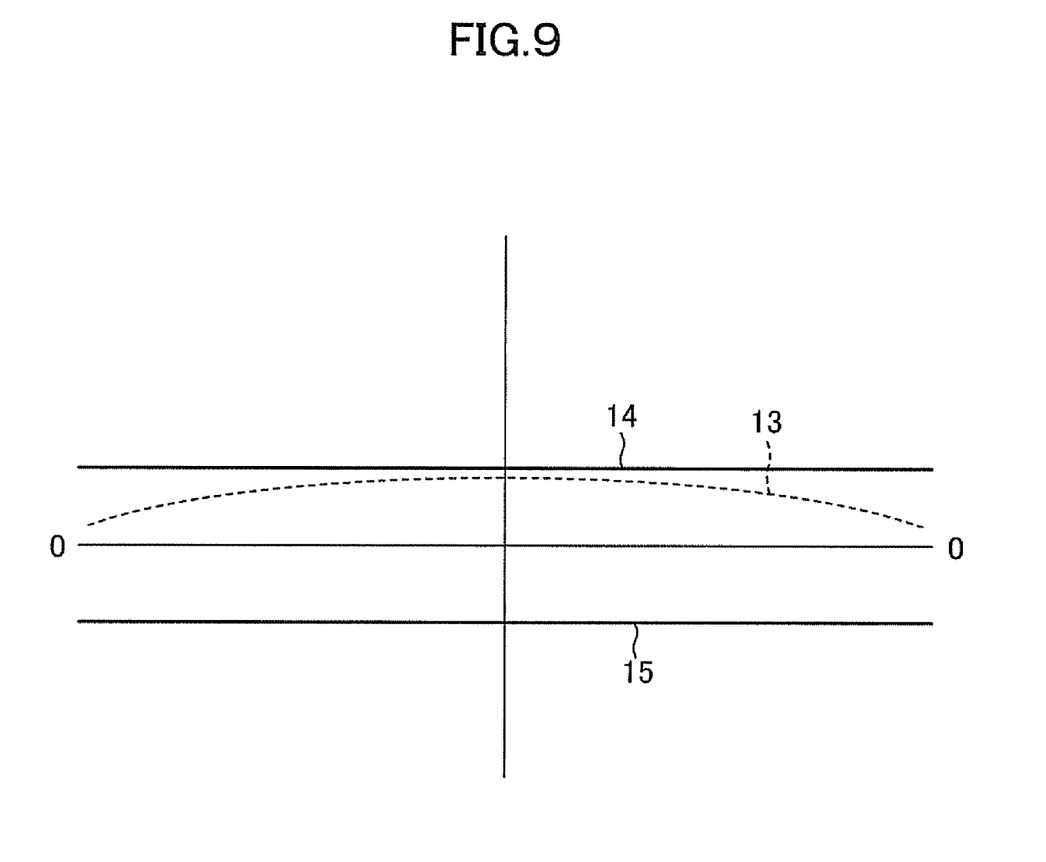
FIG. 9 is an example of display method by a display unit.

FIG. 9 shows the result of the calculation by the computer 8a provided as described above. It shows an example of display method by the display unit 9a.

According to FIG. 9, in the case where the tilt 14 of the scanning line (sub scanning line), the image forming position 15 and the curving of the scanning line can be detected, the curving 13 of the scanning line is shown where the horizontal axis represents the scanning position and the vertical axis represents the degree of curving. These may also be shown in different colors.

Figure 10:
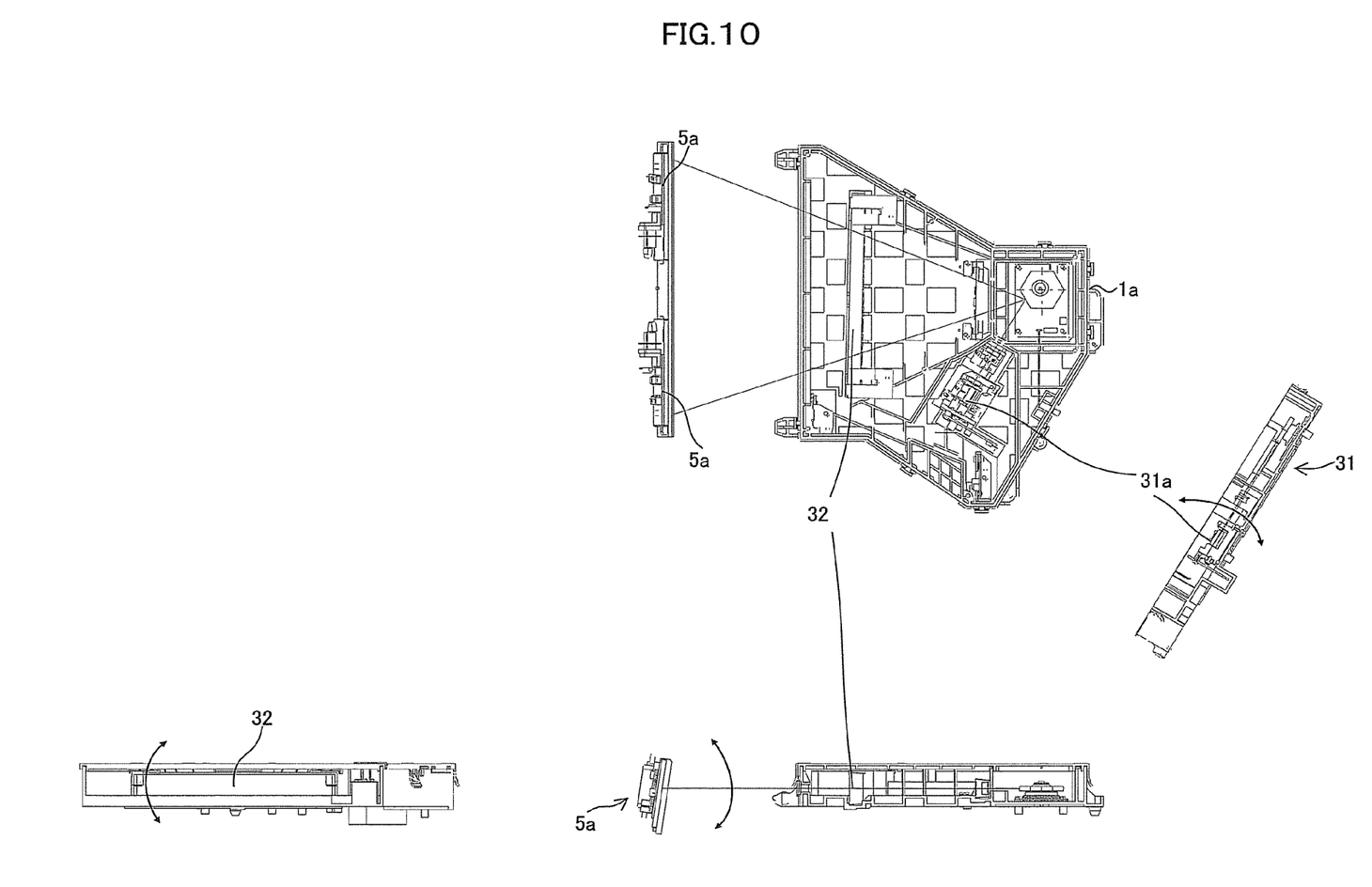
FIG. 10 is an explanatory view showing an example of adjustment method.

According to this embodiment, to show the result of the measurement displayed on this display unit, when adjustment is made by the adjusting part of each unit, the result of the adjustment is displayed in real time, that is, position detection processing of the light beam is carried out every scanning timing and the result is displayed every scanning timing. Thus, at the time of adjustment, the operator, visually recognizing the display on the display unit 9a, can adjust an upward or downward tilt of the semiconductor laser by using an attachment adjusting part of the semiconductor laser unit 31, adjust a tilt of the correction lens by using an attachment adjusting part of the correction lens, adjust a tilt of the rotary polygon mirror by using an attachment part of the rotary polygon mirror, and so on, so that the result of the display falls within a predetermined adjustment range. Therefore, these adjustments can be made very easily and quickly. For example, as shown in FIG. 10, as an upward or downward tilt of a semiconductor laser 31a of the laser unit 31 is adjusted, the image forming position can be adjusted. Also, as tilt adjustment of the correction lens 32 is made, a tilt of the scanning line can be adjusted.

Also, at the time of measurement, the computer 8a instructs a motor controller of a rotary motor, not shown, of the rotary polygon mirror 2a to increase the rotation speed to a predetermined value (make the rotation speed higher than at the time of image forming by the image forming apparatus). Thus, the scanning speed (scanning frequency) of the light beam provided by the rotation of the rotary polygon mirror 2a is increased and the pulse interval of the light beam received by the one-dimensional position detection devices 5a is shortened, thus enabling stabilization of detection accuracy.

Figure 11:
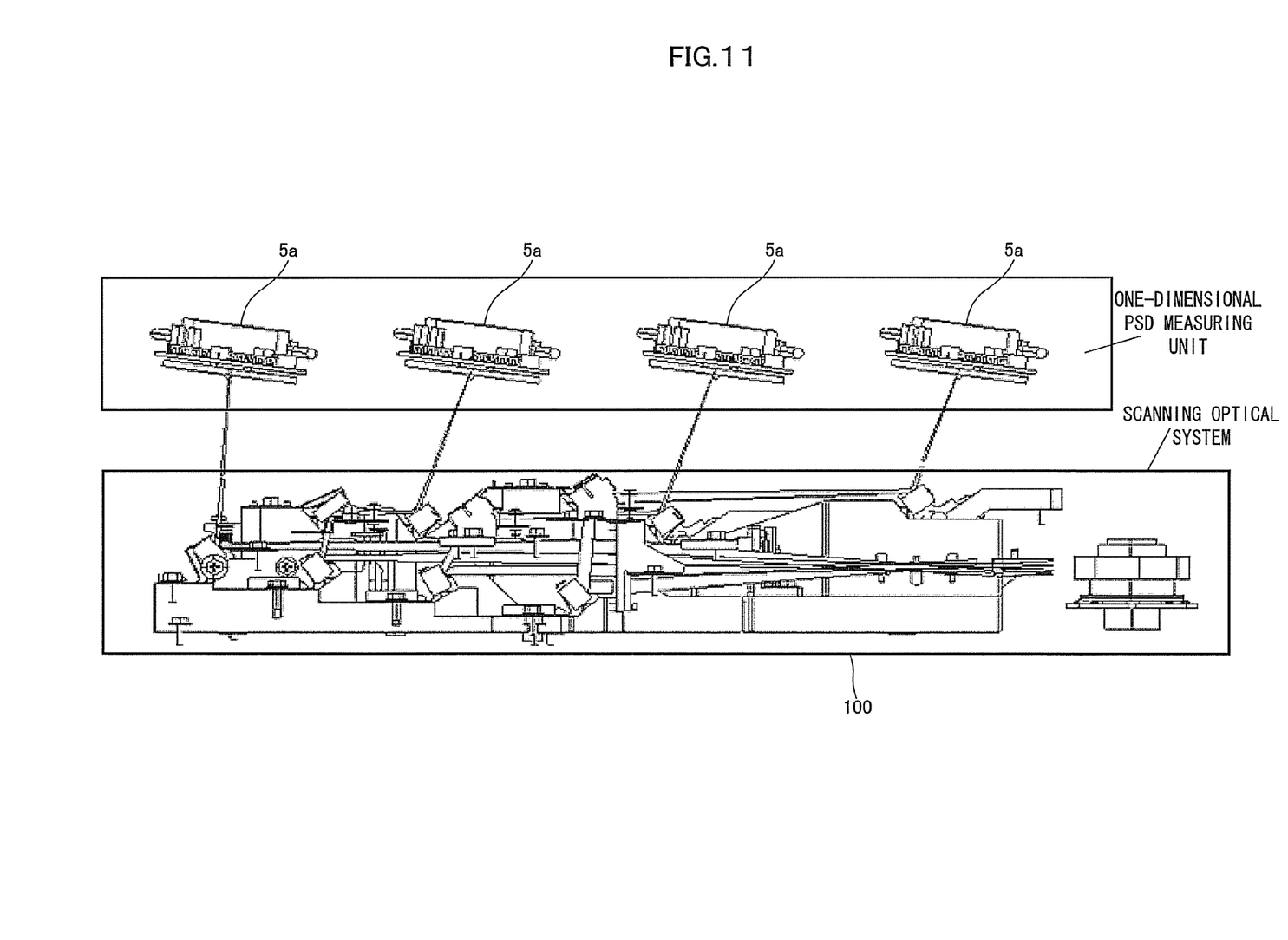
FIG. 11 is a view showing an example in which the embodiment is applied to a color image forming apparatus.

The embodiment of the invention can also be applied to a color image forming apparatus, as shown in a scanning optical system 100 of FIG. 11. As a matter of course, it can also be applied to the adjustment mechanism of each scanning optical system for each photoconductor.

As described above in detail, according to the embodiment of the invention, since the scanning state of a light beam can be measured and displayed every scanning timing, the configuration is extremely simple and low-cost. The result of adjustment operation by an operator can be visually recognized in real time and adjustment can be made easily and in a short time.

Also, since one-dimensional position detection devices are used, complicated computer software is not necessary. As synchronization with scanning timing need not be taken for signal processing, the measuring device can be simplified.

What is claimed is:

1. A scanning optical system measuring device for making adjustment of a scanning optical system which performs scanning with a light beam, comprising:
    plural one-dimensional position detection devices provided at a distance from each other in a scanning direction of a light beam caused to perform scanning, each of the one-dimensional position detection devices having a predetermined length in a one-dimensional direction intersecting the scanning direction of the light beam, each of the one-dimensional position detection devices being configured to output current values from both edges of a corresponding detection device in the one-dimensional direction in response to the scanning of the light beam, a relation between the outputted current values being determined according to a light receiving position of the light beam caused to perform scanning on a corresponding detection device so that the outputted current values indicate the light receiving position; and
    a detection signal processing unit configured to detect scanning state of the light beam on the basis of the current values outputted from the one-dimensional position detection devices.

2. The scanning optical system measuring device according to claim 1, wherein an infrared transmitting filter is provided on a light receiving part of the one-dimensional position detection devices.

3. The scanning optical system measuring device according to claim 1, wherein at least one of the one-dimensional position detection devices is provided movably in the scanning direction.

4. The scanning optical system measuring device according to claim 1, wherein the detection signal processing unit calculates and outputs at least one of a tilt of a scanning line, an image forming position and curving of a scanning line, as the scanning state of the light beam.

5. The scanning optical system measuring device according to claim 1, wherein the detection signal processing unit detects the scanning state of the light beam every scanning timing.

6. The scanning optical system measuring device according to claim 1, comprising a display unit configured to display a result of calculation and output by the detection signal processing unit.

7. The scanning optical system measuring device according to claim 1, wherein scanning with the light beam is carried out as the light beam is reflected by a rotary polygon mirror.

8. The scanning optical system measuring device according to claim 7, comprising a scanning frequency changing function to make scanning frequency of the light beam higher than scanning frequency at the time of image forming.

9. The scanning optical system measuring device according to claim 1, wherein the scanning optical system is a scanning optical system which scans an image carrier with a light beam in an image forming apparatus, and the one-dimensional position detection devices are provided at positions corresponding to positions where the image carrier is arranged.

10. A scanning optical system measuring device for making adjustment of a scanning optical system which performs scanning with a light beam, comprising:
    plural one-dimensional position detection means provided at a distance from each other in a scanning direction of a light beam caused to perform scanning, each of the plural one-dimensional position detection means having a predetermined length in a one-dimensional direction intersecting the scanning direction of the light beam, each of the one-dimensional position detection means being configured to output current values from both edges of a corresponding detection means in the one-dimensional direction in response to the scanning of the light beam, a relation between the outputted current values being determined according to a light receiving position of the light beam caused to perform scanning on a corresponding detection means so that the outputted current values indicate the light receiving position; and
    detection signal processing means for detecting scanning state of the light beam on the basis of the current values outputted from the one-dimensional position detection means.

11. The scanning optical system measuring device according to claim 10, wherein an infrared transmitting filter is provided on a light receiving part of the one-dimensional position detection means.

12. The scanning optical system measuring device according to claim 10, wherein at least one of the one-dimensional position detection means is provided movably in the scanning direction.

13. The scanning optical system measuring device according to claim 10, wherein the detection signal processing means calculates and outputs at least one of a tilt of a scanning line, an image forming position and curving of a scanning line, as the scanning state of the light beam.

14. The scanning optical system measuring device according to claim 10, wherein the detection signal processing means detects the scanning state of the light beam every scanning timing.

15. A scanning optical system measuring method for making adjustment of a scanning optical system which performs scanning with a light beam, comprising:

provided plural one-dimensional position detection devices arranged at a distance from each other in a scanning direction of a light beam which is caused to scan, each of the one-dimensional position detection devices having a predetermined length in a one-dimensional direction intersecting the scanning direction of the light beam, each of the one-dimensional position detection devices being configured to output current values from both edges of a corresponding detection device in the one-dimensional direction in response to the scanning of the light beam, a relation between the outputted current values being determined according to a light receiving position of the light beam caused to perform scanning on a corresponding detection device so that the outputted current values indicate the light receiving position;

performing scanning with the light beam and detecting the light receiving position based on the current values outputted from the one-dimensional position detection devices; and detecting scanning state of the light beam on the basis of the detected light receiving position.

16. The scanning optical system measuring method according to claim 15, wherein detection of the light receiving position by the one-dimensional position detection devices is carried out every scanning timing of the light beam, and detection of the scanning state is carried out every scanning timing of the light beam on the basis of the detected light receiving position.

17. The scanning optical system measuring method according to claim 15, wherein the light receiving position from the one-dimensional position detection devices is detected with scanning frequency of the light beam made higher than in ordinary use of the scanning optical system.

18. The scanning optical system measuring method according to claim 15, wherein curving of a scanning line is detected while the one-dimensional position detection devices are driven in the scanning direction.

* * * * *